(12) United States Patent
Khanna et al.

(10) Patent No.: US 11,379,407 B2
(45) Date of Patent: *Jul. 5, 2022

(54) CUSTOMIZABLE PIPELINE FOR INTEGRATING DATA

(71) Applicant: Palantir Technologies Inc., Palo Alto, CA (US)

(72) Inventors: Abhinav Khanna, Los Altos, CA (US); Henry Tung, Redwood City, CA (US); Lucas Ray, San Francisco, CA (US); Stephen Yazicioglu, New York, NY (US); Alexander Martino, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,537

(22) Filed: Aug. 24, 2020

(65) Prior Publication Data

US 2020/0387475 A1    Dec. 10, 2020

Related U.S. Application Data

(63) Continuation of application No. 16/035,250, filed on Jul. 13, 2018, now Pat. No. 10,754,820.

(Continued)

(51) Int. Cl.
*G06F 7/00*     (2006.01)
*G06F 16/11*    (2019.01)

(Continued)

(52) U.S. Cl.
CPC .............. *G06F 16/116* (2019.01); *G06F 9/52* (2013.01); *G06F 16/254* (2019.01)

(58) Field of Classification Search
CPC .......... G06F 16/116; G06F 9/52; G06F 16/254

(Continued)

(56) References Cited

U.S. PATENT DOCUMENTS

| | | |
|---|---|---|
| 5,418,950 A | 5/1995 | Li et al. |
| 5,428,737 A | 6/1995 | Li et al. |

(Continued)

FOREIGN PATENT DOCUMENTS

| | | |
|---|---|---|
| DE | 102014103482 A1 | 9/2014 |
| EP | 1647908 A2 | 4/2006 |

(Continued)

OTHER PUBLICATIONS

Official Communication for U.S. Appl. No. 14/304,741 dated Mar. 3, 2015.

(Continued)

*Primary Examiner* — Md I Uddin
(74) *Attorney, Agent, or Firm* — Sheppard Mullin Richter & Hampton LLP

(57) ABSTRACT

Systems, methods, and non-transitory computer readable media are provided for customizing pipelines for integrating data. A file to be ingested into a data analysis platform may be determined. The file type of the file may be detected. The file may be transformed based on the file type. The transformation may include applying a set of operations to the file. The set of operations may correspond to a pipeline of operations associated with the file type.

14 Claims, 5 Drawing Sheets

Related U.S. Application Data

(60) Provisional application No. 62/545,215, filed on Aug. 14, 2017.

(51) Int. Cl.
  *G06F 9/52* (2006.01)
  *G06F 16/25* (2019.01)

(58) Field of Classification Search
  USPC ........... 707/756, 999.001, 999.101, 692, 736
  See application file for complete search history.

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,279,015 B1 | 8/2001 | Fong et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,604,100 B1 | 8/2003 | Fernandez et al. |
| 6,643,613 B2 | 11/2003 | McGee et al. |
| 6,668,254 B2 | 12/2003 | Matson et al. |
| 6,701,352 B1 | 3/2004 | Gardner et al. |
| 6,718,336 B1 | 4/2004 | Saffer et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,968,329 B1 | 11/2005 | Chung et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,668,963 B1 | 2/2010 | Miner et al. |
| 7,707,230 B1 | 4/2010 | Brenner |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,788,935 B1 | 7/2014 | Hirsch et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 9,514,205 B1 * | 12/2016 | Yazicioglu ............ G06F 40/186 |
| 9,946,776 B1 | 4/2018 | Yazicioglu et al. |
| 2002/0087744 A1 | 7/2002 | Kitchin |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0110297 A1 | 6/2003 | Tabatabai et al. |
| 2003/0120665 A1 | 6/2003 | Fox et al. |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0117386 A1 | 6/2004 | Lavender et al. |
| 2004/0126840 A1 | 7/2004 | Cheng et al. |
| 2004/0132592 A1 | 7/2004 | Yu |
| 2004/0139212 A1 | 7/2004 | Mukherjee et al. |
| 2004/0153837 A1 | 8/2004 | Preston et al. |
| 2004/0172592 A1 | 9/2004 | Collie et al. |
| 2004/0193608 A1 | 9/2004 | Gollapudi et al. |
| 2004/0236796 A1 | 11/2004 | Bhatt et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0022111 A1 | 1/2005 | Collet et al. |
| 2005/0120080 A1 | 6/2005 | Weinreb et al. |
| 2005/0183005 A1 | 8/2005 | Denoue et al. |
| 2005/0223413 A1 | 10/2005 | Duggan et al. |
| 2005/0226473 A1 | 10/2005 | Ramesh |
| 2005/0257125 A1 | 11/2005 | Roesner et al. |
| 2005/0278286 A1 | 12/2005 | Djugash et al. |
| 2006/0004740 A1 | 1/2006 | Dettinger et al. |
| 2006/0047717 A1 | 3/2006 | Pereira |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0167909 A1 | 7/2006 | Mendis et al. |
| 2006/0209085 A1 | 9/2006 | Wong et al. |
| 2006/0236307 A1 | 10/2006 | Debruin et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0005635 A1 | 1/2007 | Martinez et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0239762 A1 | 10/2007 | Farahbod |
| 2007/0260582 A1 | 11/2007 | Liang |
| 2008/0114797 A1 | 5/2008 | Jones et al. |
| 2008/0114997 A1 | 5/2008 | Chin |
| 2008/0126344 A1 | 5/2008 | Hoffman et al. |
| 2008/0126402 A1 | 5/2008 | Sikchi et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2008/0270950 A1 | 10/2008 | Whitehead et al. |
| 2008/0291912 A1 | 11/2008 | Choi |
| 2008/0306981 A1 | 12/2008 | Jiang et al. |
| 2009/0006150 A1 | 1/2009 | Prigge et al. |
| 2009/0006610 A1 | 1/2009 | Venable |
| 2009/0007056 A1 | 1/2009 | Prigge et al. |
| 2009/0024639 A1 | 1/2009 | Steinmann |
| 2009/0043762 A1 | 2/2009 | Shiverick et al. |
| 2009/0055487 A1 | 2/2009 | Moraes et al. |
| 2009/0083275 A1 | 3/2009 | Jacob et al. |

(56) References Cited

U.S. PATENT DOCUMENTS

| | | |
|---|---|---|
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2009/0300482 A1 | 12/2009 | Summers et al. |
| 2010/0011282 A1 | 1/2010 | Dollard et al. |
| 2010/0049729 A1 | 2/2010 | Black |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0035667 A1 | 2/2011 | Dittmer-Roche |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0119583 A1 | 5/2011 | Gilley et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0313982 A1 | 12/2011 | Kranendonk et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0117008 A1 | 5/2013 | Condie et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0262061 A1 | 10/2013 | Laake |
| 2013/0275383 A1 | 10/2013 | McLarty |
| 2014/0006216 A1 | 1/2014 | Malapati et al. |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0156711 A1 | 6/2014 | Sharan et al. |
| 2014/0195891 A1 | 7/2014 | Rao et al. |
| 2014/0214579 A1 | 7/2014 | Shen et al. |
| 2014/0244388 A1 | 8/2014 | Manouchehri et al. |
| 2015/0026114 A1 | 1/2015 | Triff |
| 2015/0100541 A1 | 4/2015 | Li et al. |
| 2015/0106685 A1 | 4/2015 | Gupta |
| 2015/0112641 A1 | 4/2015 | Faraj |
| 2015/0205964 A1 | 7/2015 | Eytan et al. |
| 2015/0269030 A1 | 9/2015 | Fisher et al. |
| 2016/0026923 A1 | 1/2016 | Erenrich et al. |
| 2016/0085764 A1 | 3/2016 | Sarkar et al. |
| 2016/0092475 A1 | 3/2016 | Stojanovic et al. |
| 2016/0092476 A1 | 3/2016 | Stojanovic et al. |
| 2016/0132495 A1 | 5/2016 | Ghatage et al. |
| 2016/0161621 A1 | 6/2016 | Salama et al. |
| 2018/0210935 A1 | 7/2018 | Yazicioglu et al. |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| EP | 3185144 A1 | 6/2017 |
| GB | 2366498 A | 3/2002 |
| GB | 2508293 A | 5/2014 |
| GB | 2508503 A | 6/2014 |
| HK | 1194178 A1 | 9/2015 |
| NZ | 622485 A | 11/2014 |
| NZ | 616212 A | 1/2015 |
| NZ | 616299 A | 4/2015 |
| WO | 0034895 A1 | 6/2000 |
| WO | 2010030917 A2 | 3/2010 |
| WO | 2013030595 A1 | 3/2013 |
| WO | 2016049460 A1 | 3/2016 |
| WO | 2016064771 A1 | 4/2016 |

OTHER PUBLICATIONS

Official Communication for U.S. Appl. No. 14/562,524 dated Feb. 18, 2016.

Official Communication for U.S. Appl. No. 14/877,229 dated Mar. 22, 2016.

Official Communication for U.S. Appl. No. 15/092,814 dated Aug. 25, 2016.

Official Communication for U.S. Appl. No. 15/292,075 dated Aug. 7, 2017.

Official Communication for U.S. Appl. No. 15/292,078 dated Apr. 27, 2018.

Official Communication for U.S. Appl. No. 15/292,078 dated May 16, 2017.

Official Communication for U.S. Appl. No. 15/292,078 dated Nov. 8, 2017.

Russell et al., "Nitelight: A Graphical Tool for Semantic Query Construction," 2008, pp. 10.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Conference on Knowledge Engineering and Knowledge Management (EKAW 2008), EAcitrezza, Catania, Italy, Sep. E29-Oct. 3, 2008, pp. 16.

Stamos et al., "Remote Evaluation," Journal ACM Transactions on Programming Languages and Systems (TOPLAS) vol. 12, Issue 4, Oct. 1990, pp. 537-564.

Wikipedia, "Machine Code", p. 1-5, printed Aug. 11, 2014.

Wollrath et al., "A Distributed Object Model for the Java System," Proceedings of the 2nd Conference on USENEX, Conference on Object-Oriented Technologies (COOTS), Jun. 17, 1996, pp. 219-231.

"A Quick Guide to UniProtKB Swiss-Prot & TrEMBL," Sep. 2011, pp. 2.

"A Tour of Pinboard," <http://pinboard.in/tour> as printed May 15, 2014 in 6 pages.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.h-tml.

"The FASTA Program Package," fasta-36.3.4, Mar. 25, 2011, pp. 29.

"This File Does Not Have a Program Associated with It—What Does This Mean and What do I do?—Ask Leo!", Apr. 18, 2015,

(56) References Cited

OTHER PUBLICATIONS retrieved on May 19, 2017 from https://web.archive.org/this_file_does_not_have_a_program_associated-with_it_what_does_this_mean_and_what_do_i_do/.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb-/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Extended European Search Report for EP Appln. No. 18187721.8 dated Apr. 17, 2020, 6 pages.

Fang et al., "Computing Iceberg Queries Efficiently," Proceedings of the 24th VLDB Conference New York, 1998, pp. 299-310.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Goldstein et al., "Stacks Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the 35th Sigmod International Conference on Management of Data, Sigmod '09, Jun. 29, 2009, p. 309.

Jacques, "An extensible math expression parser with plug-ins," Code Project, Mar. 13, 2008. Retrieved on Jan. 30, 2015 from the internet: <http://www.codeproject.com/Articles/7335/An-extensible-math-expressio- n-parser-with-plug-ins>.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: An Open RDF Infrastructure for Shared Web Annotations", Computer Networks, Elsevier Science Publishers B.V., vol. 39, No. 5, dated Aug. 5, 2002, pp. 589-608.

Karp et al., "A Simple Algorithm for Finding Frequent Elements in Streams and Bags," ACM Transactions on Database Systems, vol. 28, No. 1, Mar. 2003, pp. 5155.

Kitts, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, "Chapter 16: The BLAST Sequence Analysis Tool," The NCBI Handbook, Oct. 2002, pp. 1-15.

Mcdonough, "How to Import CSV and Other Delimited Files into Microsoft Access 2007", Feb. 27, 2009 (Feb. 27, 2009), XP055410717, Retrieved from the Internet: URL:http://www.brighthub.com/computing/windows-platform/articles/27511.as-px27511.aspx [retrieved on Sep. 27, 2017].

Mendes et al., "TcruziKB: Enabling Complex Queries for Genomic Data Exploration," IEEE International Conference on Semantic Computing, Aug. 2008, pp. 432-439.

Mizrachi, "Chapter 1: GenBank: The Nuckeotide Sequence Database," The NCBI Handbook, Oct. 2002, pp. 1-14.

Notice of Acceptance for New Zealand Patent Application No. 616212 dated Jan. 23, 2015.

Notice of Acceptance for New Zealand Patent Application No. 616299 dated Apr. 7, 2015.

Notice of Acceptance for New Zealand Patent Application No. 622485 dated Nov. 24, 2014.

Notice of Allowance for U.S. Appl. No. 13/411,291 dated Apr. 22, 2016.

Notice of Allowance for U.S. Appl. No. 13/657,635 dated Jan. 29, 2016.

Notice of Allowance for U.S. Appl. No. 13/657,656 dated May 10, 2016.

Notice of Allowance for U.S. Appl. No. 13/767,779 dated Mar. 17, 2015.

Notice of Allowance for U.S. Appl. No. 13/827,627 dated Apr. 11, 2016.

Notice of Allowance for U.S. Appl. No. 14/019,534 dated Feb. 4, 2016.

Notice of Allowance for U.S. Appl. No. 14/254,757 dated Sep. 10, 2014.

Notice of Allowance for U.S. Appl. No. 14/254,773 dated Aug. 20, 2014.

Notice of Allowance for U.S. Appl. No. 14/304,741 dated Apr. 7, 2015.

Notice of Allowance for U.S. Appl. No. 14/581,902 dated Nov. 13, 2015.

Notice of Allowance for U.S. Appl. No. 15/066,970 dated Jun. 29, 2016.

Notice of Allowance for U.S. Appl. No. 15/292,075 dated Dec. 5, 2017.

Official Communication for Australian Patent Application No. 2013237658 dated Feb. 2, 2015.

Official Communication for Australian Patent Application No. 2013237710 dated Jan. 16, 2015.

Official Communication for Australian Patent Application No. 2014201580 dated Feb. 27, 2015.

Official Communication for Canadian Patent Application No. 2,807,899 dated Jun. 14, 2016.

Official Communication for Canadian Patent Application No. 2807899 dated Jul. 20, 2015.

Official Communication for Canadian Patent Application No. 2807899 dated Oct. 24, 2014.

Official Communication for Canadian Patent Application No. 2828264 dated Apr. 11, 2016.

Official Communication for Canadian Patent Application No. 2828264 dated Apr. 28, 2015.

Official Communication for Canadian Patent Application No. 2829266 dated Apr. 1, 2016.

Official Communication for Canadian Patent Application No. 2829266 dated Apr. 28, 2015.

Official Communication for European Patent Application No. 13157474.1 dated Apr. 29, 2016.

Official Communication for European Patent Application No. 13157474.1 dated Oct. 30, 2015.

Official Communication for European Patent Application No. 14159175.0 dated Feb. 4, 2016.

Official Communication for European Patent Application No. 14159175.0 dated Jul. 17, 2014.

(56) References Cited

OTHER PUBLICATIONS

Official Communication for European Patent Application No. 14159464.8 dated Feb. 18, 2016.
Official Communication for European Patent Application No. 14159629.6 dated Jul. 31, 2014.
Official Communication for European Patent Application No. 14159629.6 dated Sep. 22, 2014.
Official Communication for European Patent Application No. 15159520.4 dated Jul. 15, 2015.
Official Communication for European Patent Application No. 16187129.8 dated May 30, 2017.
Official Communication for European Patent Application No. 17185392.2 dated Oct. 9, 2017.
Official Communication for German Patent Application No. 10 2013 221 052.3 dated Mar. 24, 2015.
Official Communication for German Patent Application No. 10 2013 221 057.4 dated Mar. 23, 2015.
Official Communication for Great Britain Patent Application No. 1404574.4 dated Dec. 18, 2014.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for New Zealand Patent Application No. 616299 dated Jan. 26, 2015.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622485 dated Nov. 21, 2014.
Official Communication for U.S. Appl. No. 13/411,291 dated Jul. 15, 2015.
Official Communication for U.S. Appl. No. 13/411,291 dated Oct. 1, 2015.
Official Communication for U.S. Appl. No. 13/608,864 dated Jun. 8, 2015.
Official Communication for U.S. Appl. No. 13/608,864 dated Mar. 17, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 13/827,627 dated Aug. 26, 2015.
Official Communication for U.S. Appl. No. 13/827,627 dated Dec. 22, 2015.
Official Communication for U.S. Appl. No. 13/827,627 dated Mar. 2, 2015.
Official Communication for U.S. Appl. No. 13/827,627 dated Oct. 20, 2015.
Official Communication for U.S. Appl. No. 13/831,791 dated Aug. 6, 2015.
Official Communication for U.S. Appl. No. 13/831,791 dated Mar. 4, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/025,653 dated Mar. 3, 2016.
Official Communication for U.S. Appl. No. 14/025,653 dated Oct. 6, 2015.
Official Communication for U.S. Appl. No. 14/134,558 dated Aug. 26, 2016.
Official Communication for U.S. Appl. No. 14/134,558 dated May 16, 2016.
Official Communication for U.S. Appl. No. 14/134,558 dated Oct. 7, 2015.
Official Communication for U.S. Appl. No. 14/304,741 dated Aug. 6, 2014.

\* cited by examiner

CUSTOMIZABLE PIPELINE FOR INTEGRATING DATA

CROSS REFERENCE TO RELATED APPLICATIONS

This application is a continuation application of U.S. patent application Ser. No. 16/035,250, filed Jul. 13, 2018, which claims the benefit under 35 U.S.C. § 119(e) of U.S. Provisional Application Ser. No. 62/545,215, filed Aug. 14, 2017, the content of which is incorporated by reference in its entirety into the present disclosure.

FIELD OF THE INVENTION

This disclosure relates to customizable pipeline for integrating data.

BACKGROUND

Under conventional approaches, various types of information (e.g., files) may be provided to a data analysis platform for performing myriad operations (e.g., viewing, processing, modifying, etc.). In general, the data analysis system typically needs to be able to process files that vary in type and formatting to ensure that data included in these files can accurately be integrated.

SUMMARY

Various embodiments of the present disclosure may include systems, methods, and non-transitory computer readable media configured to determine a file to be ingested into a data analysis platform. The file type of the file may be detected. The file may be transformed based on the file type. The transformation may include applying a set of operations to the file. The set of operations may correspond to a pipeline of operations associated with the file type. The pipeline of operations may be defined by a template specification. The pipeline of operations may be customizable. The transformed file may be stored based on completion of all operations within the pipeline of operations.

In some embodiments, the pipeline of operations may include one or more serial operations, parallel operations, and one or more join operations. The join operation(s) may merge two or more results of the parallel operations. For example, data included in a single or multiple files may be operated on in parallel, and the results of the parallel operation may be joined together for use by a data analysis platform.

In some embodiments, the pipeline of operations may include a normalization operation. For example, data included in multiple files may be of different type (e.g., entered using separate scales) and the data may be normalized (e.g., into a common scale) so that the data may be joined/used together by a data analysis platform.

In some embodiments, the pipeline of operations may include an enriching operation. For example, data included in a file may be supplemented with other data from other sources to provide additional information (e.g., context) for the data.

In some embodiments, the file type of the file may be detected based on operation of one or more detectors. A given detector may be configured to detect one or more given file types. For example, a file may be passed to a first detector configured to detect a first file type. If the file type does not match the first file type, the file may be passed to a second detector configured to detect a second file type. The passing of the file between detectors may continue until the file type has been detected or no match is found from the detectors. In some embodiments, the file may be serially passed among the detectors. In some embodiments, the file may be passed to multiple detectors in parallel. In some embodiments, a detector may generate metadata for use in transforming the file.

In some embodiments, the file type of the file may be detected based on an arrangement of information within the file. For example, the file type may be detected based on a structure and/or pattern of information in the file or based on the actual information included in the file.

In some embodiments, the file may be transformed based on operation of one or more transformers. A transformer may be associated with a detector. For example, based on a file type being detected by a given detector, the file may be transformed by a given transformer associated with the given detector.

In some embodiments, the computing system may change the pipeline of operations and remove one or more effects resulting from previously applied pipeline of operations. Removing the effect(s) of prior operation pipelines may allow the computing system to resolve the pipeline against known states by atomically handling the pipeline.

In some embodiments, the transformation of the file may be case dependent, upload dependent, or user dependent. For example, one or more detectors/transformers may be associated with a given case to which the file belongs/is associated, a given upload in which the file is received, or a given user/entity that provided the file.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
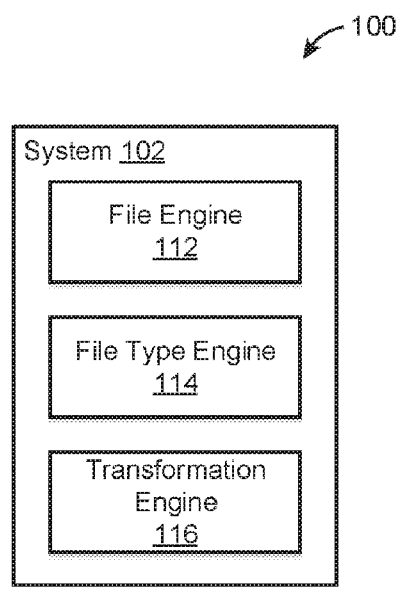
FIG. 1 illustrates an example environment for providing customizable pipelines for integrating data, in accordance with various embodiments.

A claimed solution rooted in computer technology overcomes problems specifically arising in the realm of computer technology. In various implementations, a computing system may determine a file to be ingested into a data analysis platform (e.g., based on user upload, system download). The file type of the file may be detected. In some embodiments, the file type of the file may be detected based on an arrangement of information within the file. For example, the file type may be detected based on a structure and/or pattern of information in the file or based on the actual information included in the file.

The file type of the file may be detected based on operation of one or more detectors. A given detector may be configured to detect one or more given file types. For example, a file may be passed to a first detector configured to detect a first file type. If the file type does not match the first file type, the file may be passed to a second detector configured to detect a second file type. The passing of the file between detectors may continue until the file type has been detected or no match is found from the detectors. For example, the file may be serially passed among the detectors. As another example, the file may be passed to multiple detectors in parallel. A detector may generate metadata for use in transforming the file.

The file may be transformed based on the file type. The transformation may include applying a set of operations to the file. The set of operations may correspond to a pipeline of operations associated with the file type. The transformed file may be stored based on completion of all operations within the pipeline of operations. The file may be transformed based on operation of one or more transformers. A transformer may be associated with a detector. For example, based on a file type being detected by a given detector, the file may be transformed by a given transformer associated with the given detector.

The transformation of the file may be case dependent, upload dependent, or user dependent. For example, one or more detectors/transformers may be associated with a given case to which the file belongs/is associated, a given upload in which the file is received, or a given user/entity that provided the file.

The pipeline of operations may be defined by a template specification. The pipeline of operations may be customizable. The pipeline of operations may include one or more serial operations, parallel operations, and/or one or more join operations. The join operation(s) may merge two or more results of the parallel operations. For example, data included in a single or multiple files may be operated on in parallel, and the results of the parallel operation may be joined together for use by a data analysis platform. The pipeline of operations may include a normalization operation. For example, data included in multiple files may be of different type (e.g., entered using separate scales) and the data may be normalized (e.g., into a common scale) so that the data may be joined/used together by a data analysis platform. The pipeline of operations may include an enriching operation. For example, data included in a file may be supplemented with other data from other sources to provide additional information (e.g., context) for the data.

The computing system may change the pipeline of operations and remove one or more effects resulting from a previously applied pipeline of operations. Removing the effect(s) of a prior pipeline of operations may allow the computing system to resolve the pipeline against known states by atomically handling the pipeline.

FIG. 1 illustrates an example environment 100 for providing customizable pipelines for integrating data, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. As shown in FIG. 1, in various embodiments, the computing system 102 may include a file engine 112, a file type engine 114, and a transformation engine 116. The environment 100 may also include one or more datastores that is accessible to the computing system 102 (e.g., via one or more network(s)). In some embodiments, the datastore(s) may include various databases, application functionalities, application/data packages, and/or other data that are available for download, installation, and/or execution. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the file engine 112 may be configured to determine a file to be ingested into a data analysis platform. A data analysis platform may refer to hardware/software components configured to provide analysis capabilities for data (e.g., database analysis tool). A data analysis platform may require data to be stored using a particular structure/format and/or include one or more particular types of information. The file to be ingested into the data analysis platform may be determined (e.g., identified) by the file engine 112 based on reception/identification of the file by the computing system 102 and/or reception/identification of the file by a network/server/computing device monitored by the computing system 102.

For example, a user may upload a given file to the computing system 102 or a network/server/computing device monitored by the computing system 102 via an interface that receives inputs for the data analysis platform. The file engine 112 may determine that the given file is to be ingested into the data analysis platform based on the user's use of the interface to upload the given file. As another example, a user may use the computing system 102 or a network/server/computing device monitored by the computing system 102 to select a particular file for ingestion into the data analysis platform. The file engine 112 may determine that the particular file is to be ingested into the data analysis platform based on the user's selection of the particular file.

In some embodiments, one or more characteristics/properties of the file relating to its ingestion into a data analysis platform may be defined when the user uploads/selects the file for ingestion. Such information may be used to (1) determine that the file is to be ingested into a data analysis platform, (2) identify the data analysis platform to which the file is to be ingested, (3) detect a file type of the file, and/or (4) determine any transformation(s) to be applied to the file. For example, such information may identify/relate to a name of the file, file type of the file, destination of the file, related files/case, source of the file, persons/organizations related to the file, content of the file, context of the file, and/or other information related to the file.

In some embodiments, the file to be ingested into a data analysis platform may include an archive file. An archive file may refer to a file that includes a collection multiple files in a single file (e.g., zip file, rar file, 7z file, tar file, jar file, war file). An archive file may provide for concatenation of files, compression of files, encryption of files, error detection of files, self-extraction of files, and/or other operations relating to archiving of files. An archive file may include information (e.g., metadata) relating to the files within the archive file and/or how the files within the archive file may be extracted.

In some embodiments, the file engine 112 may be configured to determine that the file to be ingested into a data analysis platform is an archive file. The file engine 112 may determine that the file is an archive file based on file format (e.g., file extension), analysis of the file (e.g., analysis of structure, pattern within the file), user input (e.g., user indication that the file is an archive file during file upload/selection for ingestion), information (e.g., metadata) relating to the file, and/or other information. Based on the file to be ingested into a data analysis platform being an archive file, the file engine 112 may extract the files within the archive file.

In various embodiments, the file type engine 114 may be configured to detect a file type of the file to be ingested into the data analysis platform. The file type engine 114 may detect the file type of the file based on file format (e.g., file extension), analysis of the file (e.g., analysis of structure, pattern within the file), user input (e.g., user indication that the file is a particular type of a file), information (e.g., metadata) relating to the file, and/or other information. For example, the file type of the file may be detected based on the particular arrangement of information within the file. That is, the file type may be detected based on the structure(s) and/or the pattern(s) of information in the file, and/or based on the actual information included in the file. For example, a file type may be determined to be a portable document format (PDF) based on the file extension. The file type may be determined to be a specific type of PDF file based on the file extension and the arrangement of information within the file. As another example, a file type may be determined to be a particular picture format based on the arrangement of information (e.g., information defining pictures, headers/metadata for the pictures) within the file. As another example, a file type may be determined to be an email of a particular type (e.g., accessible by particular email client(s)) based on the file extension and/or the information within the file. As another example, a file type may be determined to be a document relating to a particular type of investigation (e.g., claims demand information) based on organization of information within the file, actual information within the file (e.g., case identifier). Other detections of file types are contemplated.

In some embodiments, the file type of the file to be ingested into the data analysis platform may be detected based on operation of one or more detectors. A detector may refer to a service, a process, a plugin, an executable, and/or other software components. Individuals detectors may be configured to detect one or more individual file types. For example, a given detector may be configured to detect a given file type. The file type of the file to be ingested into the data analysis platform may be detected by passing the file to different detectors. In some embodiments, the file may be serially passed among different detectors. For example, a file may be passed to a first detector configured to detect a first file type. If the file type does not match the first file type, the file may be passed to a second detector configured to detect a second file type. The passing of the file between detectors may continue until the file type has been detected or no match is found from the detectors. In some embodiments, the file may be passed to multiple detectors in parallel. For example, a file may be passed on to a first detector configured to detect a first file type and a second detector configured to detect a second file type in parallel.

If the file type of the file is not detectable by any detectors, e.g., the file type may not match any of the file types detectable by the detectors, then the file may be designated as a non-integratable file. For example, the file may be marked as a generic file which is not configured for ingestion into the data analysis platform. In some embodiments, users may update/modify the set of detectors to include additional detectors for such generic files.

Once the file type of the file has been detected, the detector (that detected the file type) may pass the file to one or more software components (e.g., transformers) for transformation. In some embodiments, a detector may generate information for use in transforming the file. For example, the detector that detected the file type may generate metadata including information relating to the file type and/or information relating to transformation(s) to be performed based on the file type. The information generated by the detector may be passed to one or more software components performing the transformation and/or may be used to identify the software component(s) to perform the transformation. In some embodiments, a detector may provide the file/contents of the file to a data transformation platform for transformation. For example, the file/contents of the file may be streamed to a data transformation platform as one or more objects/stores.

In various embodiments, the transformation engine 116 may be configured to transform the file to be ingested into the data analysis platform based on the file type. Transformation of the file may include applying a set of operations to the file. An operation may include one or more data transformations. Such data transformations can include data extraction, data processing, data integration (e.g., with other data), and data manipulation (e.g., language/mathematical operations, deduping operations), to provide some examples. In some embodiments, the transformation engine 116 may store results of applying the set of operations to the file/contents of the file (e.g., the transformed file/contents) based on completion of all operations within the pipeline of operations. Such storage of the transformed file/contents may ensure data consistency.

The set of operations may correspond to a pipeline of operations associated with the file type. The pipeline of operations may be defined by one or more template specifications. The pipeline of operations may identify the operations and the order in which the operations are to be performed. The pipeline of operations may identify other data to be used in one or more of the operations (e.g., data to be integrated with/into the file/contents of the file). The pipeline of operations may enable dynamic selection of options for one or more operations. For example, the pipeline of operations may include one or more operations that receive inputs from users (e.g., selection of operation options) for performing the operation(s).

In some embodiments, the pipeline of operations may include one or more serial operations, parallel operations, one or more join operations, and/or other operations. Serial operations may refer to operations that are performed in a sequence. For example, a pipeline of operations may include a first operation and a second operation to be performed on the file/contents of the file. After the first operation is performed, the second operation may be performed. Parallel operations may refer to operations that are performed simultaneously/overlapping in time. For example, referring to the foregoing example of first and second operations, the first operation and the second operation may be performed at the same time on the file/contents of the file. Join operations may refer to operations that merge two or more results of parallel operations. For example, referring to the foregoing example of first and second parallel operations, the results of the first and second parallel operations on the file/contents of the file may be joined/merged together (e.g., for use by a data analysis platform, for further processing).

In some embodiments, the pipeline of operations may include one or more normalization operations. A normalization operation may refer to an operation that adjusts the values of some data (e.g., first dataset) so that it can be used with other data (e.g., second dataset). For example, a first dataset and a second dataset transformed by the transformation engine 116 may be recorded/entered using different scales (e.g., different measurement standards) or different properties (e.g., the first dataset including types of information not included in the second dataset). The first dataset and the second dataset may be included within a single file or multiple files to be ingested into a data analysis platform. The normalization operation can modify the first and/or the second datasets so that they can be used (e.g., joined, compared, operated) together by the data analysis platform. For example, the normalization operation may adjust the values of the first and/or the second dataset so that they are recorded using the same scale (e.g., same measurement standard) and/or may modify the information contained within the first and/or the second datasets so that they contain the same type of information.

In some embodiments, the pipeline of operations may include one or more enriching operations. An enriching operation may refer to an operation that enhances the information contained within the file. For example, data included in a file may be supplemented with data from other data sources to provide additional information (e.g., context) for the data.

The pipeline of operations may enable the use of multiple jobs to process a file/contents of a file for ingestion into a data analysis platform. For example, different parts of preparing the file/contents of the file for ingestion into the data analysis platform may be separated in different jobs. The jobs may be modular so that they are transferable to different pipelines and/or modifiable within a pipeline. The jobs may enable different operations on different portions of the file/different contents of the file.

The pipeline of operations may enable the use of linear or branching pipelines of operations. A linear pipeline may refer to a pipeline including serial operations. A branching pipeline may refer to a pipeline including parallel/join operations. For example, a branching pipeline may include a pipeline that starts with one input and ends with one output along with parallel and join operations between the input and the output. A branching pipeline may include a pipeline that starts with one input and ends with multiple outputs along with parallel operations between the input and the outputs. A branching pipeline may include a pipeline that starts with multiple inputs and ends with an output along with join operations between the inputs and the output. A branching pipeline may include a pipeline that starts with multiple inputs and ends with multiple outputs along with parallel operations between the inputs and the outputs. Use of different combinations of serial, parallel, join, and/or other operations for pipelines of operations are contemplated.

Transformation of the file/contents of the file may be performed by a data transformation platform. A data transformation platform may refer to hardware/software components configured to provide transformation capabilities for data (e.g., a data manipulation tool). A data transformation platform may provide for data extraction, data processing, data integration (e.g., with other data), data manipulation, and/or other data transformations. For example, the file/contents of the file may be mapped, converted, changed, merged, aggregated, enriched, summarized, filtered, and/or otherwise transformed by the data transformation platform. A data transformation platform may ensure that data from one application/database/platform is usable by other application(s)/database(s)/platform(s). A data transformation platform may be able to transform the file/contents of the file so that the transformed file/contents (transformed to a particular structure/format and/or transformed to include one or more particular types of information) are available for use by a data analysis platform.

Using a data transformation platform for transformation of a file/contents of a file may enable the transformation engine 116 to execute the pipeline of operations without having codes for individual operations of the pipeline. Such codes may refer to codes of the data transformation platform which, when executed, provides data extraction, data processing, data integration, data manipulation, and/or other data transformations for individual operations of the pipeline. Using the data transformation platform may reduce the size and/or the complexity of the transformation engine 116 and/or one or more software components (e.g., transformers) used for transformation. For example, rather than coding the entirety of the operations within a transformer, the transformer may include codes to request one or more of the operations to be performed by the data transformation platform.

For example, to perform a join operation, the transformation engine 116 may not need to have the raw codes that perform the join operation. Instead, the transformation engine 116 may request the join operation be performed by the data transformation platform (via application programming interface(s)). By taking advantage of the capability of the data transform platform, the transformation engine 116 may be able to execute the pipeline of operations by offloading the performance of the operations to the data transform platform. The use of the data transform platform may increase the type of operations that may be included within the pipeline of operations. The pipeline of operations may include any operations enabled by the data transform platform. The use of the data transform platform may enable the transformation engine 116 to use the resources (e.g., hardware/software capabilities) of the data transform platform for performing operations on the file/contents of the file.

In some embodiments, the file may be transformed based on operation of one or more transformers. A transformer may refer to a service, a process, a plugin, an executable, and/or other software components. In some embodiments, individual transformers may be associated with individual detectors. In some embodiments, a single transformer may be associated with multiple detectors. In some embodiments, multiple transformers may be associated with a single detector. A file/contents of the file may be transformed by a given transformer based on the file type of the file being detected by a given detector. For example, based on a file type being detected by a given detector, the file may be transformed by a given transformer associated with the given detector. For example, based on a file type of a file being detected by an email detector, an email transformer may transform the file/contents of the file. The email transformer may provide integration of an email file type for use by a data analysis platform. In some embodiments, a transformer may be associated with a given pipeline of operations/a given template specification of the given pipeline. The operation of the transformer may include execution of the associated pipeline of operations to transform the file/contents of the file.

In some embodiments, one or more transformers may be activated based on user selection of the transformer(s). For example, a user may be provided with a view of the transformers identified (transformers corresponding to the detector that detected the file type) for transformation of files/contents of files. The user may select one or more of the identified transformers to activate the transformer and execute the pipeline of operations corresponding to the selected transformers.

In some embodiments, the transformation of the file may be case dependent, upload dependent, and/or user dependent. For example, one or more detectors/transformers may be associated with a given case to which the file belongs/is associated, a given upload in which the file is received, or a given user/entity that provided the file. Use of case dependent detectors/transformer allows the same/particular detectors/transformers to be used for files associated with a given case. Use of upload dependent detectors/transformer allows the same/particular detectors/transformers to be used for files uploaded together. Use of user-dependent detectors/transforms allows the same/particular detectors/transformers to be used for files provided by the same user/entity.

For example, transaction records of two different entities (first entity, second entity) may be stored using the same file extension (e.g., workbook file format). However, the transaction records of the different entities may be stored differently (e.g., include different information, include information stored using different organization) such that the transformation of the records for ingestion into a data analysis platform may require different operations/pipelines of operations. For example, the transaction records of the first entity may require different clean-up operations (e.g., filtering, deduping) than the transaction records of the second entity.

As another example, a case may include files of different types. The different types of files may require different operations/pipeline of operations for ingestion into a data analysis platform. The files may be uploaded separately, with the upload-specific detectors/transformers being used for separate uploads to transform the files/contents of the files so that they may be used together. The transformed files/contents of the files may be used together (e.g., merged, compared) using case-specific detectors/transformers. Other uses of case-dependent, upload-dependent, user-dependent detectors/transformers are contemplated.

The pipeline of operations may be customizable. Customizing a pipeline of operations may include one or more of adding a new operation to the pipeline, removing an operation from the pipeline, and/or modifying an operation within the pipeline. Customizing pipeline of operations may include changing one or more parameters of one or more operations within the pipeline. The pipeline of operations may be customized via changes to the corresponding template specifications.

In some embodiments, a pipeline of operations may be managed to resolve the pipeline of operations against known states. Managing the pipelines may include atomically handling the pipelines and removing effects of prior versions of pipelines. For example, changing a pipeline of operations may include removing one or more effects resulting from a previous version of the pipeline (e.g., removing effect(s) of previously applied operations). For example, a pipeline of operations may include operation A, followed by operation B, followed by operation C. Operation B may have an effect of storing certain information in a database. The pipeline of operations may have been used to process a file uploaded at a given time (upload A). The pipeline of operations may be modified to remove operation B from the pipeline. If upload A is unprocessed/reprocessed, a special/modified pipeline (e.g., delete pipeline) may be constructed to remove the effects of operation B (the certain information stored in the database) from the pipeline. In some embodiments, an effect of an operation may be removed by providing a null input into operation B. For example, operation B may have taken a given input to stored certain information in a database. Passing a null value to operation B may result in removal of the certain information from the database.

Figure 2:
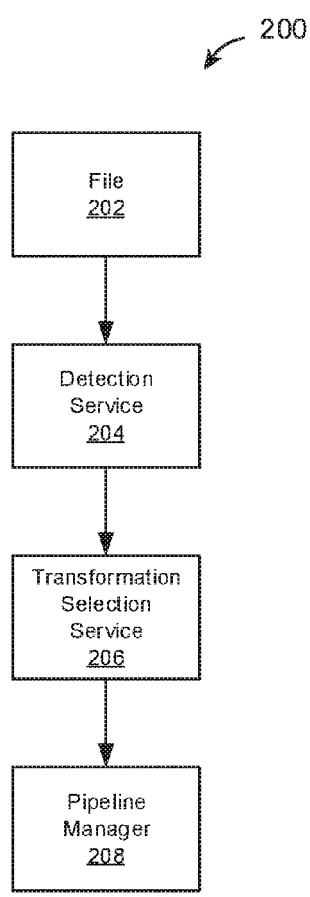
FIG. 2 illustrates an example operation flow for integrating data, in accordance with various embodiments.

FIG. 2 illustrates an example operation flow 200 for integrating data, in accordance with various embodiments. The operation flow 200 may begin with determination of a file 202 to be ingested into a data analysis platform. The determination of the file 202 may be performed as described above with respect to the file engine 112. The file 202 may then be passed to a detection service 204. A service may include one or more services, processes, plugins, executables, and/or software components. The detection service 204 may determine a file type of the file 202. The determination of the file type of the file may be performed as described above with respect to the file type engine 114. The file type of the file 202 may then be passed to a transformation selection service 206. The transformation selection service 206 may identify one or more transformations that may be performed on the file 202 based on the file type of the file 202. The transformation(s) may be identified as described above with respect the file type engine 114 and/or the transformation engine 116 (e.g., based on detector-transformer pairings). A transformation may include a pipeline of operations. The file 202 may then be passed to a pipeline manager 208. The pipeline manager 208 may manage the pipeline of operations of the transformation(s) of the file 202. Managing the pipeline of operations may include executing the pipeline or operations, dynamically building/modifying the pipeline of operations, and/or performing other operations relating to the pipeline of operations. The pipeline manager 208 may provide one or more interfaces (e.g., user interfaces, APIs) that allow users to select, build, and/or modify particular transformations/pipeline of operations.

Figure 3:
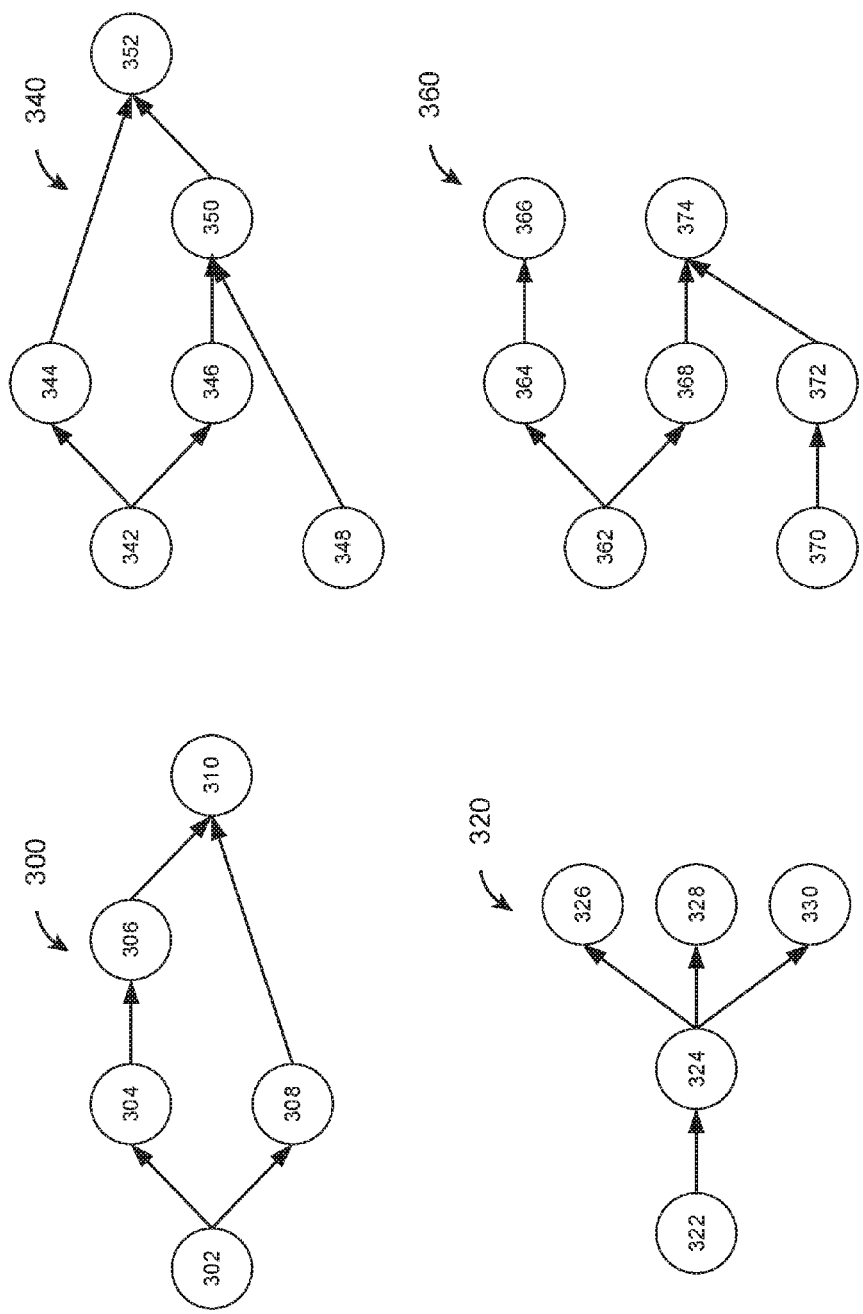
FIG. 3 illustrates example pipelines of operations for integrating data, in accordance with various embodiments.

FIG. 3 illustrates example pipelines of operations 300, 320, 340, 360 for integrating data, in accordance with various embodiments. Other types/structures of pipelines of operations are contemplated. Individual operations within the pipelines of operations 300, 320, 340, 360 may include one or more operations based on type of the file, context of the file/accessed portion(s) of the file, source of the file/accessed portion(s) of the file, and/or other properties relating to the file/accessed portion(s) of the file. Individual operations within the pipelines of operations 300, 320, 340, 360 may process/modify the file/portion(s) of the file.

The pipeline of operations 300 may begin with an operation 302 that accesses one or more portions of a file. Serial operations 304, 306 may then be performed on the portion(s) of the file. Parallel to the serial operations 304, 306, a parallel operation 308 may be performed on the portion(s) of the file. The results of the serial operations 304, 306 and the parallel operation 308 may be joined by a join operation 310. The joined results may be provided to a data analysis platform.

The pipeline of operations 320 may begin with an operation 322 that accesses one or more portions of a file. An operation 324 may then be performed on the portion(s) of the file. The operation 324 may be followed by three branching/parallel operations 326, 328, 330. That is, the result of applying the operation 324 on the file may be used to perform three separate operations 326, 328, 330 in parallel. The results of the parallel operations 326, 328, 330 may be provided to a data analysis platform.

The pipeline of operations 340 may begin with operations 342, 348 that access one or more portions of one or more files. For example, the operation 342 may access one portion of a file and the operation 348 may access another portion of the file. As another example, the operation 342 may access portion(s) of a file and the operation 348 may access portion(s) of another file. The operation 342 may be followed by two branching/parallel operations 344, 346. The results of the operation 346 and the portion(s) of the file accessed by the operation 348 may be joined by a join operation 350. The results of the operation 344 and the join operation 350 may then be joined by a join operation 352. The joined results may be provided to a data analysis platform.

The pipeline of operations 360 may begin with operations 362, 370 that access one or more portions of one or more files. For example, the operation 362 may access one portion of a file and the operation 370 may access another portion of the file. As another example, the operation 362 may access portion(s) of a file and the operation 370 may access portion(s) of another file. The operation 362 may be followed by two branching/parallel operations 364, 368. The operation 364 may be followed by a serial operation 366. The operation 370 may be followed by a serial operation 372. The results of the operation 368 and the operation 372 may be joined by a join operation 374. The results of the operations 366, 374 may be provided to a data analysis platform.

Figure 4:
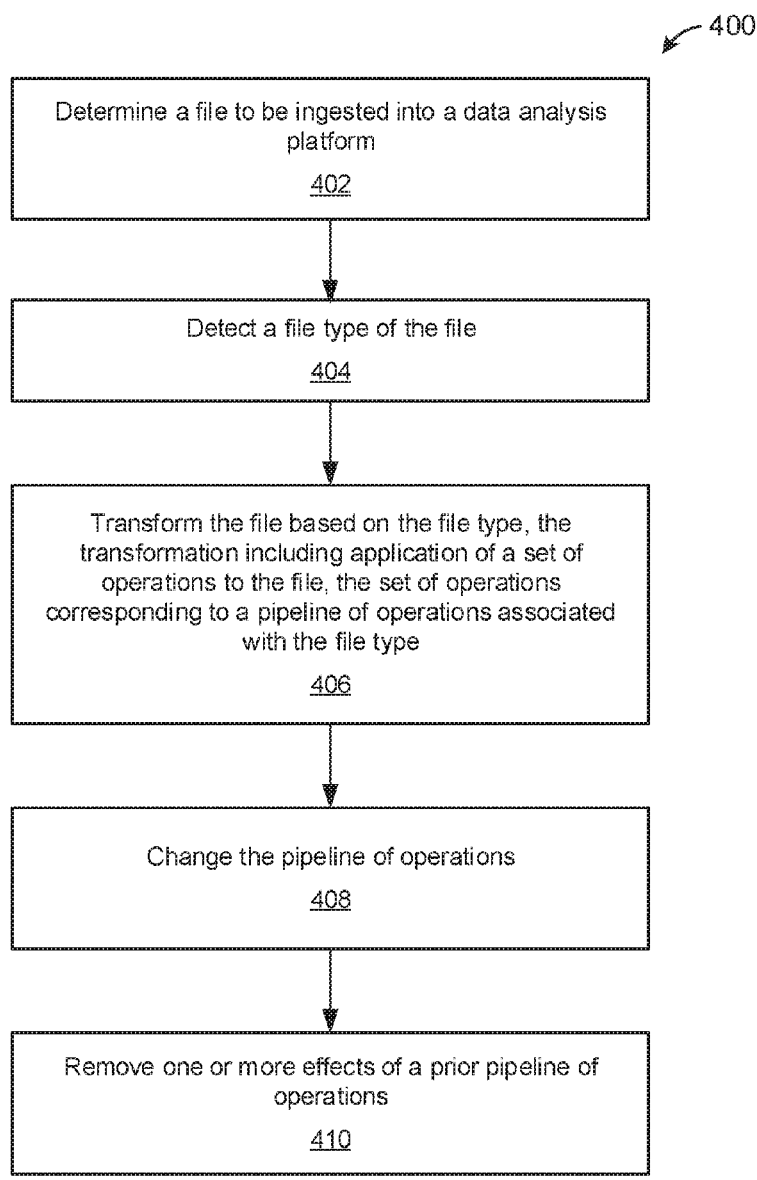
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a file to be ingested into a data analysis platform may be determined. At block 404, a file type of the file may be detected. At block 406, the file may be transformed based on the file type. The transformation may include applying a set of operations to the file. The set of operations may correspond to a pipeline of operations associated with the file type. At block 408, the pipeline of operations may optionally be changed. At block 410, one or more effects of a prior pipeline of operations may optionally be removed.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
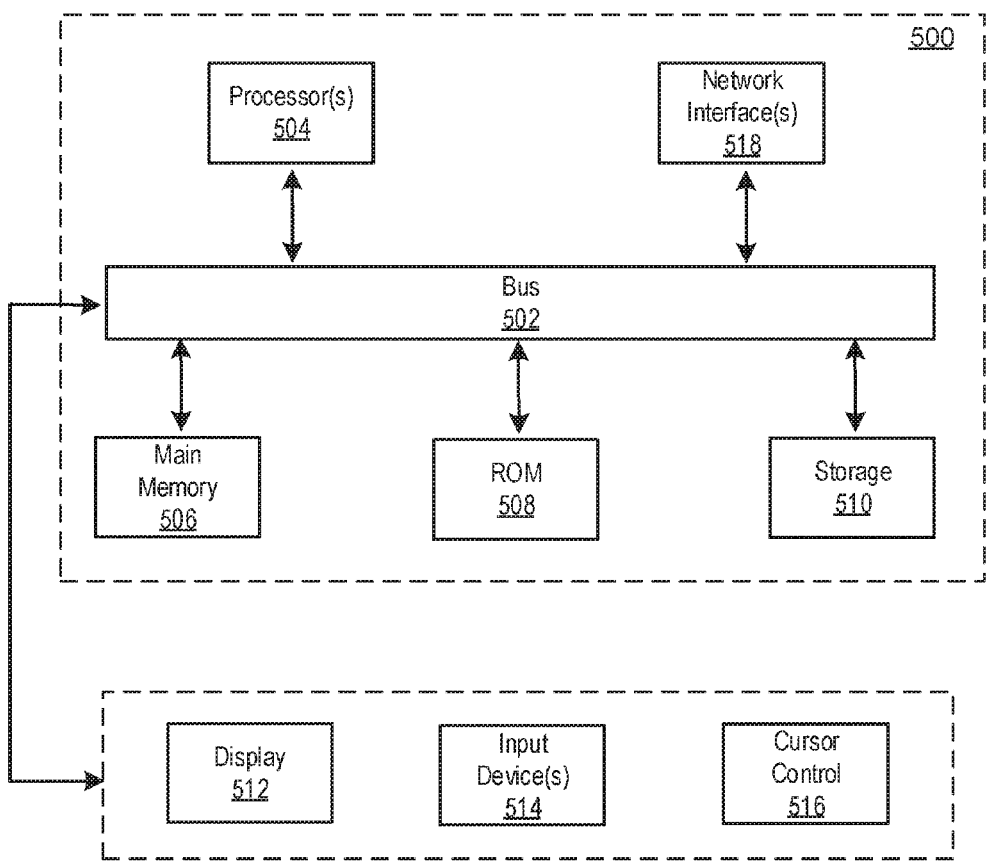
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, and one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising: one or more processors; and a memory storing instructions that, when executed by the one or more processors, cause the system to perform:
   determining a file is to be ingested into a data analysis platform in response to a user selecting the file, wherein the file is of a file type;
   with existing detectors, detecting the file type based on structure information, pattern information, or actual information within the file;
   in response to the file being undetectable by the detectors, marking the file type as generic and creating a new detector to detect the file type;
   in response to one of the existing detectors or the new detector detecting the file type:
      generating, by the one of the existing detectors or the new detector, metadata including information relating to the file type or information relating to one or more operations to be performed based on the file type;
      identifying, by the one of the existing detectors or the new detector, a particular transformer, wherein the particular transformer executes at least a portion of the one or more operations based on the metadata; and
      passing the metadata to the particular transformer; and
   removing an effect resulting from a previous version of a pipeline of operations or from the one or more operations by constructing a delete pipeline.

2. The system of claim 1, wherein the one or more operations include one or more serial operations, one or more parallel operations, and one or more join operations, the one or more join operations merging two or more results of the parallel operations.

3. The system of claim 1, wherein the one or more operations include a normalizing operation.

4. The system of claim 1, wherein the delete pipeline deletes previously stored information in a database.

5. The system of claim 1, wherein the detecting comprises continuously passing the file to different detectors until one of the detectors recognizes the file.

6. A method implemented by a computing system including one or more processors and storage media storing machine-readable instructions, wherein the method is performed using the one or more processors, the method comprising:
   determining a file is to be ingested into a data analysis platform in response to a user selecting the file, wherein the file is of a file type;
   with existing detectors, detecting the file type based on structure information, pattern information, or actual information within the file;
   in response to the file being undetectable by the detectors, marking the file type as generic and creating a new detector to detect the file type;
   in response to one of the existing detectors or the new detector detecting the file type:
      generating, by the one of the existing detectors or the new detector, metadata including information relating to the file type or information relating to one or more operations to be performed based on the file type;
      identifying, by the one of the existing detectors or the new detector, a particular transformer, wherein the particular transformer executes at least a portion of the one or more operations based on the metadata; and
      passing the metadata to the particular transformer; and
   removing an effect resulting from a previous version of a pipeline of operations or from the one or more operations by constructing a delete pipeline.

7. The method of claim 6, wherein the one or more operations include one or more serial operations, one or more parallel operations, and one or more join operations, the one or more join operations merging two or more results of the parallel operations.

8. The method of claim 6, wherein the one or more operations include a normalizing operation.

9. The method of claim 6, wherein the delete pipeline deletes previously stored information in a database.

10. The method of claim 6, wherein the detecting comprises continuously passing the file to different detectors until one of the detectors recognizes the file.

11. A non-transitory computer readable medium comprising instructions that, when executed, cause one or more processors to perform:
   determining a file is to be ingested into a data analysis platform in response to a user selecting the file, wherein the file is of a file type;
   with existing detectors, detecting the file type based on structure information, pattern information, or actual information within the file;
   in response to the file being undetectable by the detectors, marking the file type as generic and creating a new detector to detect the file type;
   in response to one of the existing detectors or the new detector detecting the file type:
      generating, by the one of the existing detectors or the new detector, metadata including information relating to the file type or information relating to one or more operations to be performed based on the file type;
      identifying, by the one of the existing detectors or the new detector, a particular transformer to perform at least a portion of the one or more operations based on the metadata; and
      passing the metadata to the particular transformer; and
   removing an effect resulting from a previous version of a pipeline of operations or from the one or more operations by constructing a delete pipeline.

12. The non-transitory computer readable medium of claim 11, wherein the one or more operations include one or more serial operations, one or more parallel operations, and one or more join operations, the one or more join operations merging two or more results of the parallel operations.

13. The non-transitory computer readable medium of claim 11, wherein the one or more operations include a normalizing operation.

14. The non-transitory computer readable medium of claim 11, wherein the delete pipeline deletes previously stored information in a database.

* * * * *